United States Patent
Matsumura

Patent Number: 6,006,719
Date of Patent: Dec. 28, 1999

[54] CYLINDER DIRECT INJECTION SPARK-IGNITION ENGINE

[75] Inventor: Motohiro Matsumura, Yokohama, Japan

[73] Assignee: Nissan Motor Co., Ltd., Yokohama, Japan

[21] Appl. No.: 09/076,118

[22] Filed: May 12, 1998

[30] Foreign Application Priority Data

May 21, 1997 [JP] Japan .................................. 9-131200

[51] Int. Cl.$^6$ .................................................. F02B 17/00
[52] U.S. Cl. ............................................. 123/302; 123/308
[58] Field of Search ................................. 123/302, 306, 123/308, 305, 432

[56] References Cited

U.S. PATENT DOCUMENTS

| | | | |
|---|---|---|---|
| 5,335,634 | 8/1994 | Hashimoto et al. | 123/308 |
| 5,394,845 | 3/1995 | Noh et al. | 123/308 |
| 5,553,588 | 9/1996 | Gono et al. | 123/276 |

FOREIGN PATENT DOCUMENTS

| | | | |
|---|---|---|---|
| 0 532 020 | 3/1993 | European Pat. Off. | F02B 17/00 |
| 0 768 457 | 4/1997 | European Pat. Off. | F02F 1/42 |
| 02125911 | 5/1990 | Japan | F02B 23/10 |
| 09041980 | 2/1997 | Japan | F02B 31/02 |

*Primary Examiner*—Willis R. Wolfe
*Assistant Examiner*—Hieu T. Vo
*Attorney, Agent, or Firm*—Foley & Lardner

[57] ABSTRACT

A cylinder direct injection spark-ignition engine comprises a cylinder block having cylinders. A cylinder head is fixedly mounted on a block deck of the cylinder block and has first and second intake ports for each cylinder. A fuel injector valve directly injects fuel into a combustion chamber corresponding to each cylinder. A spark plug has a tip end section projecting into the combustion chamber. A piston defines the combustion chamber between it and the cylinder head. The piston has, at its piston crown, a generally circular cavity having a center axis offset from a center axis of the piston toward the intake valves. A swirl control valve controls air flow in the first intake port in accordance with an engine operating condition. The second intake port has an axis whose at least a major part is contained in a first vertical plane which inclines relative to a second vertical plane to form a first predetermined angle, the first vertical plane gradually approaching the center axis of the piston in a direction toward the combustion chamber relative to the vertical cross flow plane. The first and second vertical planes are vertical to the block deck. The second vertical plane passes through the first intake and exhaust valves and is perpendicular to a third vertical plane containing the center axes of the cylinders and vertical to the block deck. The first intake and exhaust valves are located on opposite sides of the third vertical plane.

11 Claims, 2 Drawing Sheets

CYLINDER DIRECT INJECTION SPARK-IGNITION ENGINE

The contents of Japanese Patent Application No. 9-131200, with a filing date of May 21, 1997 in Japan, are hereby incorporated by reference.

BACKGROUND OF THE INVENTION

1. Field of the Invention

This invention relates to improvements in a cylinder direct injection spark-ignition engine in which fuel (such as gasoline) is directly injected into a cylinder, and more particularly to the improvements for achieving effective stratified charge combustion in such an engine.

2. Description of the Prior Art

Cylinder direct injection spark-ignition engines for an automotive vehicle have been proposed and put into practical use, in which fuel is directly injected into an engine cylinder to be ignited by a spark plug. One of them is disclosed in U.S. Pat. No. 5,553,588 entitled "Spark-ignited Direct Cylinder Fuel Injection Engine" and configured as follows: The engine has two intake ports for each cylinder, in which one of the ports is provided with a swirl control valve. Additionally, a piston is formed at its piston crown with a cavity forming part of a combustion chamber. Upon closing the swirl control valve, intake air is introduced into the combustion chamber through the other intake port thereby generating gas flow in the combustion chamber. In compression stroke, fuel is injected into the cavity thereby locally forming a layer of air-fuel mixture around the spark plug thus achieving stratified charge combustion.

Now, in the cylinder direct injection spark-ignition engines, it is required to carry the layered air-fuel mixture to the vicinity of the spark plug at a spark timing for obtaining a good heat generation timing.

However, in the above-discussed conventional cylinder direct injection spark-ignition engine, the gas flow in the combustion chamber is formed under the effect of the intake port which is directed outwardly or toward the periphery of the cylinder bore relative to a vertical cross flow plane, and therefore the gas flow is formed along the periphery of the cylinder bore regardless of presence or absence of the cavity formed at the piston crown. Accordingly, in order to smoothly accomplishing vaporization and transportation of air-fuel mixture for enabling lean air-fuel mixture combustion, control using a separate control factor becomes necessary thus complicating the configuration of the combustion chamber and control of the engine.

BRIEF SUMMARY OF THE INVENTION

It is an object of the present invention to provide an improved cylinder direct injection spark-ignition engine which can overcome drawbacks encountered in conventional cylinder direct injection spark-ignition engines.

Another object of the present invention is to provide an improved cylinder direct injection spark-ignition engine which can effectively accomplish stratified charge combustion thereby achieving stable combustion of lean air-fuel mixture.

A further object of the present invention is to provide an improved cylinder direct injection spark-ignition engine in which swirl of intake air is generated inside a circular cavity formed at a piston crown under the effect of an intake port which is arranged generally tangential to the periphery of the cavity.

A cylinder direct injection spark-ignition engine of the present invention comprises a cylinder block having a plurality of cylinders. A cylinder head is fixedly mounted on the block deck of the cylinder block. The cylinder head has first and second intake ports and first and second intake ports for each cylinder. A fuel injector valve is provided for directly injecting fuel into a combustion chamber formed corresponding to each cylinder. A spark plug is provided having a tip end section which is projected into the combustion chamber. A piston is movably disposed in the cylinder to define the combustion chamber between it and the cylinder head. The piston is formed at its piston crown with a generally circular cavity having a center axis which is offset from a center axis of the piston toward the intake valves. A swirl control valve is disposed to control air flow in the first intake port in accordance with an engine operating condition. In the thus arranged engine, the second intake port has an axis whose at least a major part is contained in a first vertical plane which inclines relative to a second vertical plane to form a first predetermined angle, the first vertical plane gradually approaching the center axis of the piston in a direction toward the combustion chamber relative to the vertical cross flow plane. The first and second vertical planes are vertical to the block deck of the cylinder block. The second vertical plane passes through the first intake and exhaust valves and is perpendicular to a third vertical plane containing the center axes of the cylinders and vertical to the block deck. The first intake and exhaust valves are located respectively on opposite sides of the third vertical plane.

With the above-arranged cylinder direct injection spark-ignition engine, intake air is introduced through the second intake port by blocking the first intake port with the swirl control valve, so that gas flow is generated in the combustion chamber. The second intake port is inwardly directed relative to the vertical cross flow plane and arranged tangentially to the periphery of the cavity formed at the piston crown, and therefore the gas flow is positively formed as swirl within the cavity at the piston crown. Consequently, the gas flow can vaporize air-fuel mixture to allow lean combustion and carry the air-fuel mixture to the vicinity of the spark plug.

DETAILED DESCRIPTION OF THE INVENTION

Figure 1:
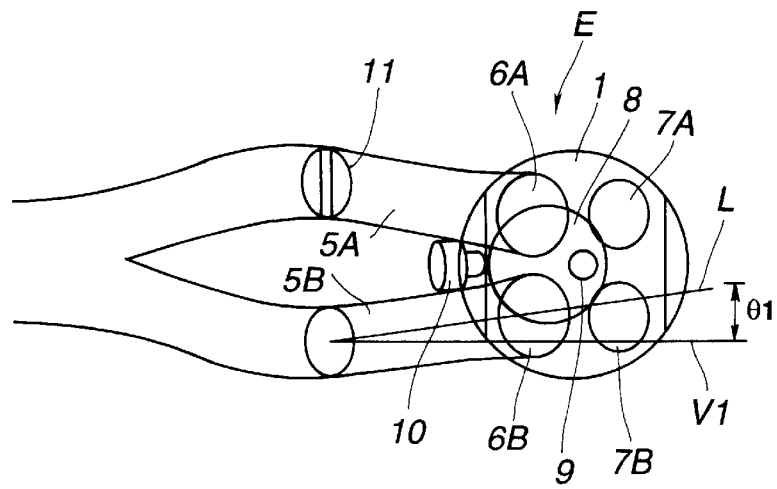
FIG. 1 is a schematic plan view of an embodiment of a cylinder direct injection spark-ignition engine according to the present invention.
Figure 2:
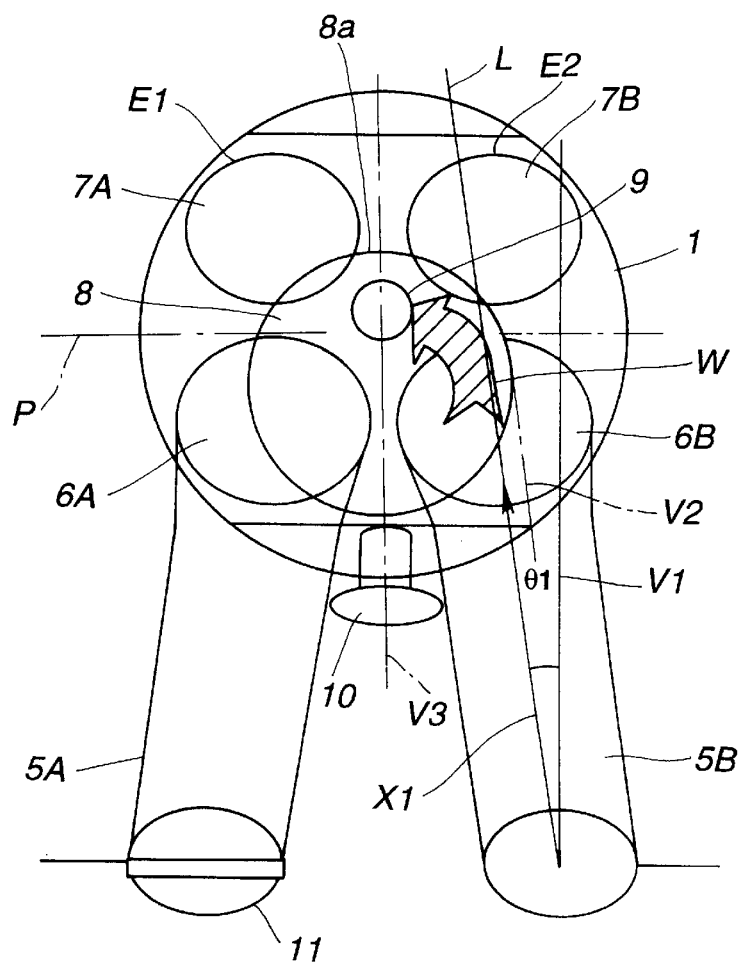
FIG. 2 is an enlarged plan view of the engine of FIG. 1.
Figure 3:
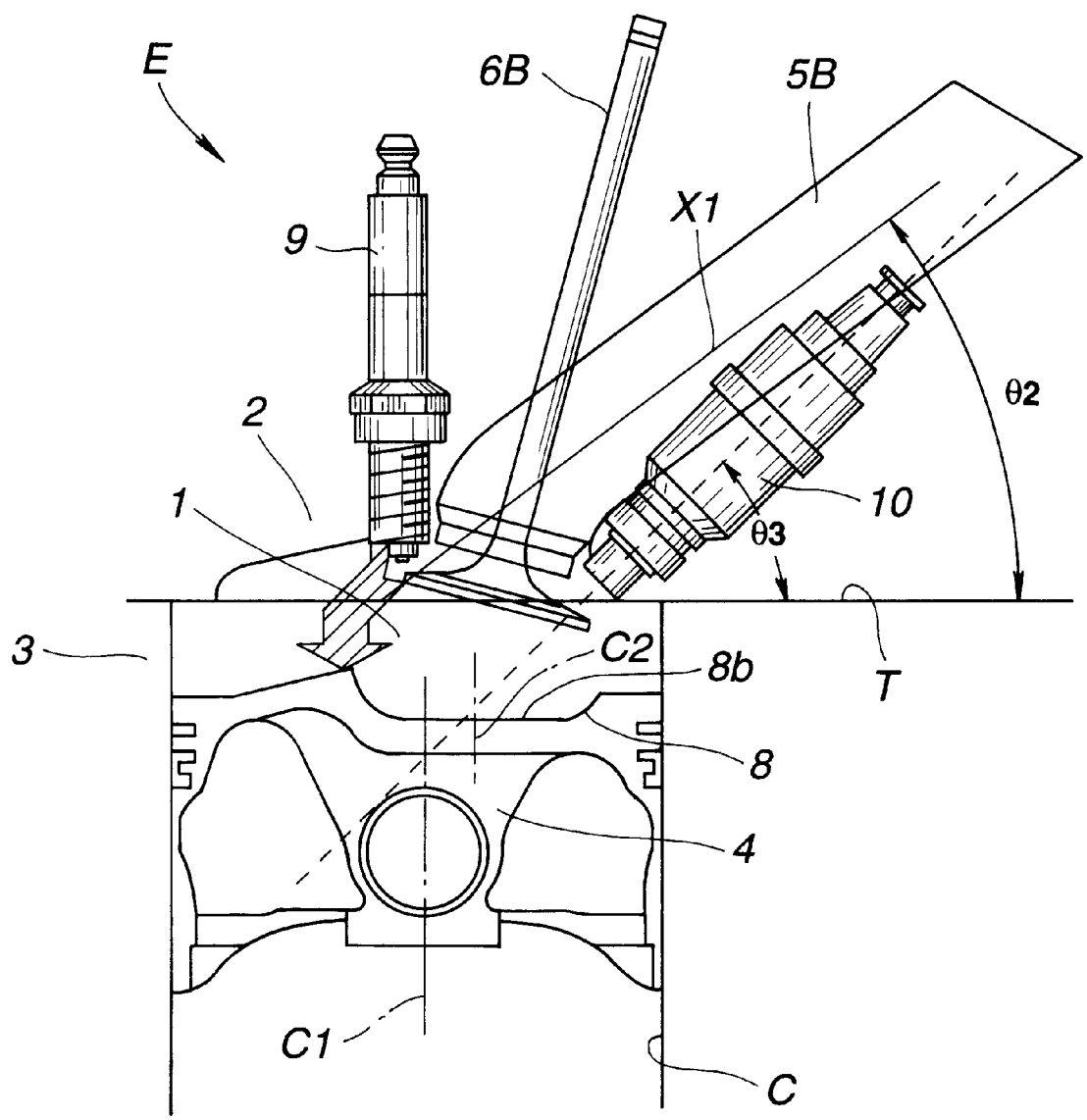
FIG. 3 is an enlarged vertical sectional view of the engine of FIG. 1.

Referring now to FIGS. 1 to 3 of the drawings, an embodiment of a cylinder direction injection spark-ignition (gasoline-fueled) engine according to the present invention is illustrated by the reference character E. The engine E of this embodiment has a plurality of engine cylinders C formed in a cylinder block 3 though only one cylinder C is shown. A piston is movably disposed in each cylinder C to define a combustion chamber 1 between it and a cylinder head 2 which is secured at its bottom flat surface to the block deck (cylinder upper-deck) or top flat surface T of the cylinder block 3.

The cylinder head 2 is formed with two (first and second) intake ports 5A, 5B and two exhaust ports E1, E2 (shown in FIG. 2) for each cylinder C or for each combustion chamber 1. The two intake ports 5A, 5B are located at an opposite side of a vertical cylinder axis plane P with respect to the two exhaust ports E1, E2, in which the vertical cylinder axis plane P contains the center axes (not shown) of the plural cylinders C. The intake ports 5A, 5B have respectively downstream ends (opened to the combustion chamber 1) at which two intake valves 6A, 6B are respectively movably disposed. The exhaust ports E1, E2 have respectively upstream ends (opened to the combustion chamber 1) at which two exhaust valves 7A, 7B are respectively movably disposed.

The piston 4 is formed at its piston crown with a circular cavity or depression 8 forming part of the combustion chamber 1. More specifically, the cavity 8 is formed at the top surface of the piston crown and shallow or flat so that its bottom surface B is generally flat. The center axis C2 of the cavity 8 is parallel with and offset from the center axis C1 of the piston 4 toward the intake valves 6A, 6B, i.e., located closer to the intake valves 6A, 6B than to the exhaust valves 7A, 7B.

A spark plug 9 is installed to the cylinder head 2 so that its tip end section (having electrodes) projects into the combustion chamber 1 and located above a part of the peripheral annular portion of the circular cavity 8. A fuel injector valve 10 is disposed between the first and second intake ports 5A, 5B as viewed from the above as shown in FIG. 2 and positioned to inject fuel (gasoline) directly into the combustion chamber 1. The fuel injector valve 10 is positioned such that its axis (indicated by a dotted line) forms a predetermined angle $\theta 3$ relative to the top flat surface T of the cylinder block 3 (or relative to the bottom flat surface of the cylinder head 2) and is directed to the bottom surface 8b of the cavity 8. The predetermined angle $\theta 3$ is within a range of from 35 degrees to 45 degrees, preferably about 45 degrees. Accordingly, the fuel injector valve 10 injects fuel in an obliquely downward direction or toward the cavity 8. The fuel injector valve 10 is arranged to inject fuel at a fuel injection timing in compression stroke, in case of accomplishing stratified charge combustion.

A swirl control valve 11 is movably disposed to block the first intake port 5A and arranged to be controllably opened or closed in accordance with an engine operating condition. In this embodiment, the swirl control valve 11 is controlled to be generally fully closed, in a predetermined engine operating condition in which stratified charge combustion is to be carried out. The swirl control valve 11 may be partly closed to control air flow in the first intake port 5A in another predetermined engine operating condition. The second intake port 5B is formed extending generally tangentially to the periphery 8a of the cavity 8. More specifically, a vertical port axis plane L containing the axis X1 (or at least a major part of the axis X1) of the second intake port 5B is inclined relative to a vertical cross flow plane V1 in a manner to gradually approach the center axis C1 of the piston 4 in a direction toward the combustion chamber 1, in which a predetermined angle (port inwardly directing angle) $\theta 1$ is formed between the vertical port axis plane L and the vertical cross flow plane V1. The predetermined angle $\theta 1$ is within a range of not smaller than 5 degrees and smaller than 15 degrees, preferably about 8 degrees. Additionally, the vertical port axis plane L is generally parallel with a vertical plane V2 containing a tangent line of the periphery 8a of the circular cavity 8 on an imaginary horizontal plane or the block deck H of the cylinder block 3. In this embodiment, the vertical port axis plane L is located inside the vertical plane V2 and extends passing through a space outside the spark plug 9 and inside relative to the periphery 8a of the circular cavity 8. It will be understood that the vertical port axis plane L, the vertical cross flow plane V1, and the vertical plane V2 are vertical to the block deck or top flat surface H of the cylinder block 3. The vertical cross flow plane V1 passes through the intake valve 6B and the exhaust valve 7B and is perpendicular to the cylinder axis plane P which contains the axes of the cylinders C. It will be understood that the cylinder axis plane P is vertical to the block deck H. Thus, in other words, the predetermined angle $\theta 1$ is an angle of inward inclination of the intake port 5B (more specifically, the intake port axis X1) relative to a cross-flow horizontal direction V1. In a multi-cylinder engine, the predetermined angle $\theta 1$ may also be defined as a horizontally measured angle formed between the intake port axis X1 and a line V1, where the line V1 is in a verticle plane that both extends through an intake valve 6B and an exhaust valve 7B and is prependicular to the vertical cylinder axis plane P containing the center axes of the adjacent cylinders.

Additionally, the major part of straight part of the axis X1 of the second intake port 5B inclines downward in a direction toward the combustion chamber 1, in which the axis X1 forms a predetermined angle (port inclination angle) $\theta 2$ relative to the block deck or top flat surface T of the cylinder block 3 or relative to the bottom flat surface of the cylinder head 2. The predetermined angle $\theta 2$ is within a range of larger than 30 degrees and smaller than 40 degrees, preferably 38 degrees. Thus, the predetermined angle $\theta 2$ can be considered an intake port angle, since it is an angle between the intake port axis X1 and the top flat surface T of the cylinder block 3. It is to be noted that the first intake port 5A blockable with the swirl control valve 11 is formed and shaped generally symmetrical to the second intake port 5B with respect to a vertical central plane V3 which contains the center axis C2 of the cavity 8 and the center axis C1 of the piston 4 and parallel with the vertical cross flow plane V1, so that the axes of the first and second intake ports 5A, 5B gradually approach to each other in the direction toward the combustion chamber 1 as clearly shown in FIG. 2.

As shown in FIG. 2, the tip end (having the electrodes) of the spark plug 9 is located inside relative to the vertical port axis plane L containing the axis X1 of the second intake port 5B. In this embodiment, the spark plug 9 is positioned such that the vertical central plane V3 passes through the tip end section of the spark plug 9.

Next, manner of operation of the thus arranged cylinder direct injection spark-ignition engine will be discussed.

Under an engine operating condition (for example, a low load engine operating condition) in which stratified charge combustion is to be carried out, the swirl control valve 11 is controlled to be generally fully closed to block the first intake port 5A. Accordingly, when the intake valves 6A, 6B lift and are opened in intake stroke in which the piston 4 descends, intake air is sucked into the combustion chamber 1 through the second intake port 5B which is not blocked by the swirl control valve 11, in which intake air is regulated in its flowing direction under the effect of the port inwardly directing angle $\theta 1$ and the port inclination angle $\theta 2$. The thus sucked intake air generates gas flow in the form of inclined swirl in the combustion chamber 1 as indicated by a hatched arrow W in FIG. 2. It is to be noted that the port inwardly directing angle $\theta 1$ and the port inclination angle $\theta 2$ are selected to make the above gas flow optimum inside the cavity 8 formed at the piston crown of the piston 4. This gas flow is maintained until piston operation reaches the course of compression stroke. Subsequently, in compression stroke, the gas flow vaporizes atomized fuel injected from the fuel injector valve 10 and carry the atomized fuel near the spark plug 9.

Thus, according to the above-arranged cylinder direct injection spark-ignition engine according to the present invention, swirl having a relatively small radius of gyration is generated in the cavity 8 at the piston crown so that atomized fuel injected from the fuel injector valve 10 is vaporized and carried to the vicinity of the spark plug 9. Therefore, combustion of lean air-fuel mixture can be achieved throughout a wide engine operating range. In contrast, in conventional cylinder direct injection spark-ignition engines, swirl having a relatively large radius of gyration is generated inside an engine cylinder for the purpose of promoting combustion of air-fuel mixture in a combustion chamber mainly under the effect of turbulence during combustion.

More specifically, according to the present invention, gas flow is generated along the periphery 8a of the circular cavity 8 in the piston 4. This gas flow vaporizes air-fuel mixture so as to allow lean air-fuel mixture to be easily combusted and carries the air-fuel mixture to the vicinity of the electrodes of the spark plug 9, thus making it possible to combust lean air-fuel mixture with a simple configuration of the engine. In contrast, in the conventional engine disclosed in the above-discussed U.S. Pat. No. 5,553,588, the intake port is formed in the shape to be outwardly directed relative to the vertical cross flow plane, and therefore gas flow is generated along the peripheral surface of the bore of a cylinder regardless of presence or absence of a cavity formed at the piston crown.

While the first intake port 5A blockable with the swirl control valve 11 has been also shown and described as being formed to have the port inwardly directing angle θ1 so as to be symmetrical with the second intake port 5B, it will be understood that the first intake port 5A may not be formed to have the port inwardly directing angle θ1. However, it is to be noted that forming the first intake port 5A to have the port inwardly directing angle θ1 and symmetrical with the second intake port 5B can provide such advantages that air streams introduced from the first and second intake ports strike against each other in the combustion chamber during homogeneous charge combustion in which intake air is sucked through both the first and second intake ports, thereby promoting mixing of air and fuel injected from the fuel injector in intake stroke.

What is claimed is:

1. A cylinder direct injection spark-ignition engine, comprising:
   a cylinder block having a plurality of cylinders;
   a cylinder head fixedly mounted on a block deck of said cylinder block, said cylinder head having first and second intake ports and first and second exhaust ports for each cylinder;
   first and second intake valves movably disposed to said cylinder head, said first and second intake ports being closable respectively by said first and second intake valves, and first and second exhaust valves movably disposed to said cylinder head, said first and second exhaust Ports being closable respectively by said first and second exhaust valves;
   a fuel injector valve for directly injecting fuel into a combustion chamber formed corresponding to each cylinder;
   a spark plug whose tip end section is projected into the combustion chamber;
   a piston movably disposed in the cylinder to define the combustion chamber between it and said cylinder head, said piston being formed at its piston crown with a generally circular cavity having a center axis which is offset from a center axis of said piston toward said intake valves; and
   a swirl control valve disposed to control air flow in said first intake port in accordance with an engine operating condition;
   wherein said second intake port has an axis whose at least a major part is contained in a first vertical plane which inclines relative to a second vertical plane to form a first predetermined angle, the first vertical plane gradually approaching the center axis of said piston in a direction toward the combustion chamber relative to said second vertical plane, the first and second vertical planes being vertical to the block deck of said cylinder block, the second vertical plane passing through said first intake and exhaust valves and being perpendicular to a third vertical plane containing the center axes of the cylinders and vertical to the block deck, said first intake and exhaust valves being located respectively on opposite sides of said third vertical plane.

2. A cylinder direct injection spark-ignition engine as claimed in claim 1, wherein the first vertical plane is generally tangential to the periphery of said circular cavity in the piston crown of said piston.

3. A cylinder direct injection spark-ignition engine as claimed in claim 1, wherein the first vertical plane is generally parallel with a fourth vertical plane containing a tangent line of the periphery of said circular cavity on the block deck, the fourth vertical plane being vertical to the block deck.

4. A cylinder direct injection spark-ignition engine as claimed in claim 1, wherein the tip end section of said spark plug is disposed above a peripheral portion of said circular cavity and located on an opposite side of said first vertical plane with respect to said second vertical plane.

5. A cylinder direct injection spark-ignition engine as claimed in claim 1, wherein the first vertical plane passes through a space between the periphery of said circular cavity and said spark plug.

6. A cylinder direct injection spark-ignition engine as claimed in claim 1, wherein said fuel injector valve has an axis which is directed into said circular cavity in the piston crown of said piston, said fuel injector valve being located between said first and second intake ports on a plane containing the block deck.

7. A cylinder direct injection spark-ignition engine as claimed in claim 1, wherein said swirl control valve is arranged to substantially block said first intake port under a predetermined engine operating condition in which stratified charge combustion is made in the combustion chamber.

8. A cylinder direct injection spark-ignition engine as claimed in claim 1, wherein said first and second intake ports are located on an opposite side of said third vertical plane with respect to first and second exhaust ports.

9. A cylinder direct injection spark-ignition engine as claimed in claim 1, wherein said first predetermined angle is within a range of not smaller than 5 degrees and smaller than 15 degrees.

10. A cylinder direct injection spark-ignition engine as claimed in claim 1, wherein the at least a major part of the axis of said second intake port forms a second predetermined angle relative to a surface of said block deck of said cylinder block, said second predetermined angle being within a range of larger than 30 degrees and smaller than 40 degrees.

11. A cylinder direct injection spark-ignition engine as claimed in claim 1, wherein said fuel injector valve has an axis which forms a third predetermined angle relative to a surface of said block deck of said cylinder block, said third predetermined angle being within a range of from 35 degrees and 45 degrees.

* * * * *